United States Patent
Proctor, Jr. et al.

(10) Patent No.: US 7,787,408 B2
(45) Date of Patent: Aug. 31, 2010

(54) WIRELESS REPEATER WITH MASTER/SLAVE CONFIGURATION

(75) Inventors: James A. Proctor, Jr., Melbourne Beach, FL (US); Kenneth M. Gainey, Satellite Beach, FL (US); James C. Otto, West Melbourne, FL (US); Lawrence W. LaMont, Jr., Indialantic, FL (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 11/802,094

(22) Filed: May 18, 2007

(65) Prior Publication Data

US 2008/0013473 A1    Jan. 17, 2008

Related U.S. Application Data

(60) Provisional application No. 60/801,396, filed on May 19, 2006.

(51) Int. Cl.
*H04B 7/14* (2006.01)
*H04B 3/36* (2006.01)
*H04B 7/185* (2006.01)

(52) U.S. Cl. .......................... 370/315; 370/279; 455/7; 455/13.3; 455/13.4; 455/20

(58) Field of Classification Search .................. 370/315, 370/279; 455/7, 13.3, 13.4, 20
See application file for complete search history.

(56) References Cited

U.S. PATENT DOCUMENTS 7,233,771 B2    6/2007   Proctor, Jr. et al.

| | | | |
|---|---|---|---|
| 2002/0028655 A1* | 3/2002 | Rosener et al. | 455/16 |
| 2004/0047319 A1* | 3/2004 | Elg | 370/338 |
| 2004/0047335 A1 | 3/2004 | Proctor, Jr. et al. | |
| 2004/0185794 A1* | 9/2004 | Jeong et al. | 455/78 |
| 2005/0157674 A1* | 7/2005 | Wentink | 370/328 |
| 2005/0286468 A1* | 12/2005 | Agin et al. | 370/331 |
| 2006/0098715 A1* | 5/2006 | Amano | 375/132 |
| 2006/0195883 A1 | 8/2006 | Proctor, Jr. et al. | |
| 2007/0025347 A1* | 2/2007 | Cohen et al. | 370/389 |
| 2007/0268846 A1 | 11/2007 | Proctor, Jr. et al. | |

OTHER PUBLICATIONS

International Search Report—PCT/US07/011878, International Search Authority—US, Sep. 11, 2007.
Written Opinion—PCT/US07/011878, International Search Authority—US, Sep. 11, 2008.

* cited by examiner

*Primary Examiner*—Barry W Taylor
(74) *Attorney, Agent, or Firm*—Linda G. Gunderson

(57) ABSTRACT

A wireless repeater extends a coverage area of a wireless network base station within a structure or facility. The repeater includes a master unit for wirelessly communicating with the wireless network base station and a slave unit for wirelessly communicating with one or more subscriber terminals. The master unit is connected to the slave unit through new or existing wiring in the structure to enable the master unit to transmit wireless signals to the slave unit on a downlink transport frequency and to receive wireless signals from the slave unit on an uplink transport frequency in a manner that is transparent to the wireless base station and the subscriber terminals.

36 Claims, 16 Drawing Sheets

100

SETUP PROCESS

300

Monitoring For Master/Slave oscillations and Optimum Gain Settings

SIGNAL ATTENUATION (dB) vs. TRANSPORT FREQUENCY (Hz)

WIRELESS REPEATER WITH MASTER/SLAVE CONFIGURATION

CROSS REFERENCE TO RELATED APPLICATION

The present application is related to and claims priority from U.S. Provisional Patent Application 60/801,396 filed May 19, 2006, the contents of which are incorporated herein by reference.

TECHNICAL FIELD

The technical field relates generally to wireless communications and more specifically to a wireless repeater system for extending wireless coverage through usage of existing or new cabling within a facility or building structure.

BACKGROUND

Numerous RF-based repeaters exist that provide wireless communication network coverage to areas in which such coverage would otherwise be weak or non-existent. Such coverage is important because a high percentage, which some studies indicate to be near 40%, of network subscribers live, work or travel in areas having such weak or non-existent coverage.

Several types of RF-based repeaters support frequency division duplexing (FDD) systems and enhance network coverage in networks providing wireless service in various frequency bands and supporting various wireless standards, including IS-95, IS-2000, W-CDMA, HSDPA/HSUPA, TDS-CDMA, IEEE802.11, IEEE802.16, and the like. In such a configuration, a first repeater unit in communication with a wireless base station (BS) receives RF signals through an antenna, typically located at the top of a large structure such as a shopping mall or parking deck. The first repeater unit then communicates the downlink RF signals, often along with a local oscillator (LO) signal, to a remotely located second repeater or repeaters over existing or new building cabling. Some of these types of repeater systems transport the RF signals at their original frequencies, while others utilize an intermediate frequency (IF) for transporting the signals. Where an intermediate frequency is used, an LO reference signal is provided along with the IF based signal. These repeater systems are often referred to an "in-building distribution systems." The second repeaters, often referred to as remote or slave units, in turn communicate with subscriber terminals to provide wireless coverage within the structure and communicate subscriber terminal RF signals back to the transceiver through an uplink established with the first repeater unit through the new building cabling, including in some cases fiber optic cabling. The LO signal enables the first repeater unit in communication with the BS and the second repeaters in communication with subscriber terminals to minimize frequency offset.

However, the above repeater typically is complex, and therefore expensive, to install and involves a significant amount of network planning due to the size of the structures in which it is typically implemented. Generally, new cabling must be used for these systems, and in most deployments a single cable must be installed between the first repeater or master unit and each remote unit. The replication of cabling drives the cost of the deployment due to both materials and labor. Because a cable is installed from the master to each remote, rearranging the remote units or installing additional remote units is difficult and expensive. Finally these remote units are generally not in communication with the master unit and therefore if malfunctions arise, the operator will often remain unaware of the condition for an indefinite period of time.

Another RF-based repeater that has increased in popularity in countries such as South Korea finds use in residential applications. In such a system, typically cabling is run from an external antenna outside to an indoor repeater unit that transmits on a second antenna within the home. Performance of such a system is dependent upon the isolation of the two antennas, and can vary based on their physical separation, and antenna orientation. Further, the benefits of this solution are typically outweighed by the costs for requisite professional installation.

While such a configuration does not need to tap into existing home wiring or cabling, professional installation is required as previously noted because the repeater includes a transmit antenna and a receive antenna that must be physically separated. Also, the signal strength of the repeater must be adjusted downwardly in proportion to the proximity of the transmit and receive antennas to one another to prevent transmit and receive signals, which share the same frequency, from oscillating due to their coupling. As a result of the signal strength of each repeater being adjusted downwardly, such a repeater provides incremental improvement in network coverage and signal strength in many cases, thereby resulting in only marginal benefit to some network subscribers, and a highly variable outcome for the carriers who often install them.

One known same-frequency RF-based residential repeater in a self-install package is available in which isolation between the transmit and receive antennas in each repeater is achieved by using directional antennas, by physically separating the antennas and by adjusting the repeater transmit/receive signal strength downwardly to prevent receiver desensitization and oscillation. However, the repeaters themselves are large and bulky due to the need to physically separate the antennas and are expensive due to their many RF components. The benefit provided by such repeaters is marginal due to the close proximity of both antennas, and therefore the minimal isolation limits their effectiveness. In addition, the solution provides incremental improvement in network coverage and signal strength, thereby resulting in only marginal benefit to network subscribers.

SUMMARY

In view of the above limitations, an RF-based Frequency Domain Duplexing (FDD) repeater system is provided in which a master unit is in communication with a wireless base station and one or more slave or remote units are in communication with one or more subscriber terminals. The master unit communicates with the slave unit through a physical connection to existing or new residential wiring such as co-axial cable, Ethernet cable, power lines and phone lines, or fiber optic cabling. When new cabling is used, a single coaxial (for example) cable may be shared with all the remote units, providing a simplified installation and a greatly reduced cost. Further, reconfiguration or addition of the save units is a relatively simple matter when compared to the existing solutions. When used with existing wiring, often other services may be supported simultaneously such as Multimedia over Coax Alliance (MoCA), satellite IF and Digital Subscriber Line (DSL). In both cases the cellular, or wireless, signals are transported an in intermediate frequency between the master and slave units. The specific intermediate frequencies used for this transport are coordinated through a master slave communication protocol (MSCP) resulting in a frequency translation in a manner that is transparent to the wireless base station and the subscriber terminals. As the frequency translation is transparent to the wireless network, the configuration complies with all licensed spectrum communication standards.

The repeater system is applicable to FDD systems such as those based on protocols such as IS-2000, IS-95, GSM and WCDMA. This approach is also applicable to Time Division Duplexing (TDD) systems such as PHS, WIFI, WIMAX and TDS-CDMA. The slave units in the repeater system each include a local oscillator that is synchronized to that of the master to ensure that a very low frequency offset is imparted to the repeated RF signal. This synchronization is accomplished utilizing a novel message based approach whereby the timing offsets between the master and slave units may be very accurately mitigated. The master and slave units will transport the frequency translated downlink signal from the base station on a downlink transport frequency and the uplink signal from the wireless terminal device on the uplink transport frequency. While these two frequencies would be different for a FDD based system, they would likely be the same IF for a TDD based system. In addition to transporting uplink and downlink signals, the master and slave units will also communicate with each other through master slave communication protocol (MSCP) packets which may be on the same uplink and downlink transport frequencies during a predetermined time period which may be pseudorandom when the master or slave units puncture the analog wireless signal as carried on the uplink or downlink transport frequencies to insert the digital MSCP packets, wherein the frequency channels on the wiring or cabling used to transport the up and down link signals are referred to herein as "transport frequencies." The MSCP packets are used in configuring and installing the master and slave units, transmitting power control among the units, and minimizing the timing and frequency offsets between the master and slave units. The MSCP packets may also be used for communicating status of the remote units to alert the operator of a malfunction or other general status.

The repeater system is also capable of maintaining a quality link between the base station and subscriber terminals through interference measurement and management, testing and qualifying transport frequencies, tuning the upstream and downstream transport frequencies, independently detecting interference during predetermined puncture off times, and performing periodic transport frequency channel scans by the master unit and coordinated with the slave units during punctured off times. This IF management becomes important when existing cabling is used in a structure, or when very strong interfering signals are coupled to the cables when new wiring is used.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the present invention.

DETAILED DESCRIPTION

Figure 1A:
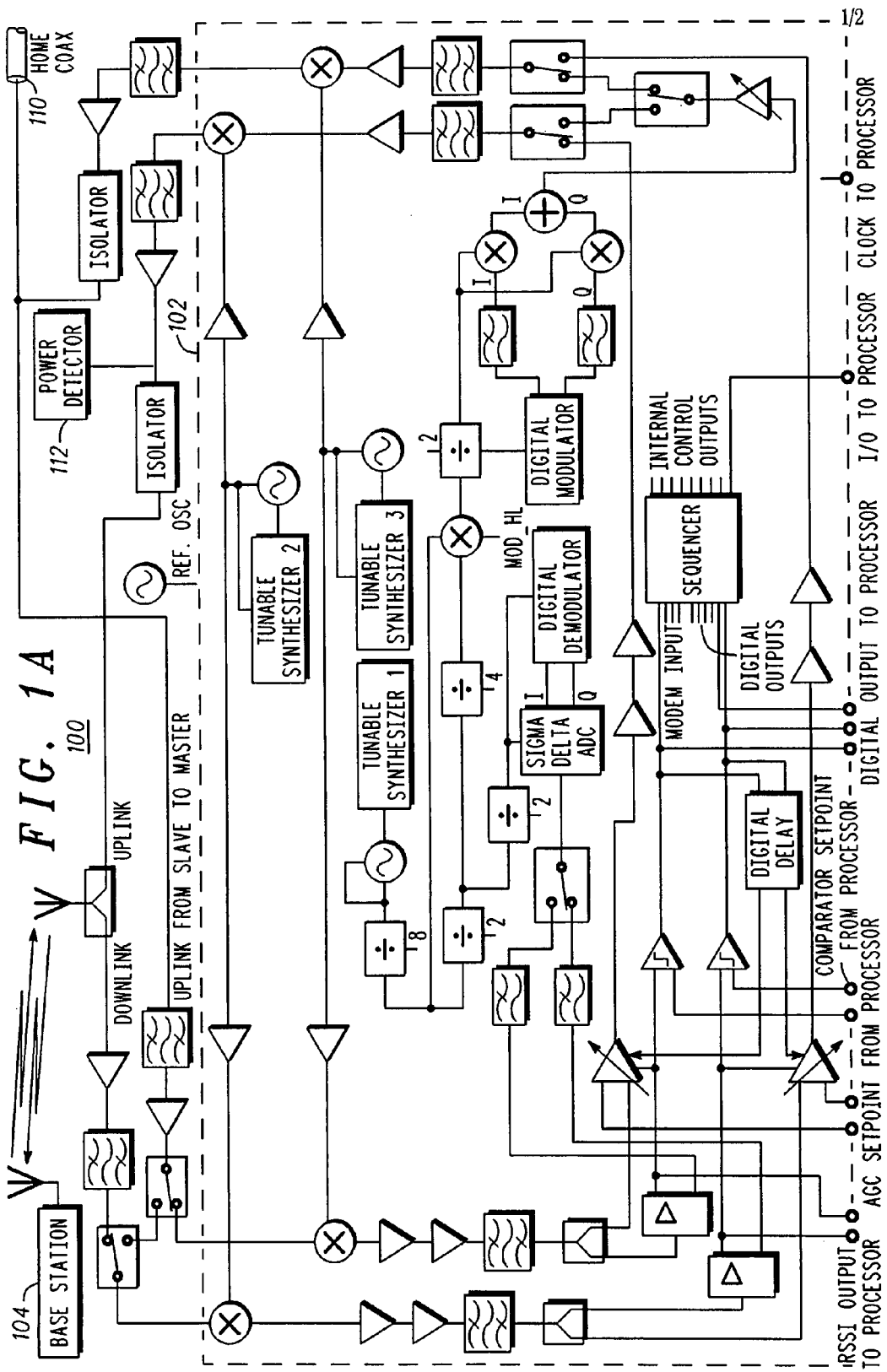
FIG. 1A and FIG. 1B are schematic diagrams illustrating an exemplary architecture of an exemplary wireless repeater system.

Referring now to the drawings in which like numerals reference like parts, several exemplary embodiments will now be described.

The instant disclosure is provided to further explain in an enabling fashion the best modes of performing one or more embodiments. The disclosure is further offered to enhance an understanding and appreciation for the inventive principles and advantages thereof, rather than to limit in any manner the invention.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefor, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the exemplary embodiments.

The present application incorporates by reference the contents of the following: U.S. patent application Ser. No. 10/465,817 entitled Wireless Local Area Network Extension Using Existing Wiring And Wireless Repeater Module(s); U.S. patent application Ser. No. 11/127,320 entitled Non-frequency Translating Repeater with Detection and Media access control; U.S. patent application Ser. No. 11/340,860 entitled Physical Layer Repeater with Discrete Time Filter for All-digital Detection and Delay Generation; and U.S. patent application Ser. No. 11/730,361 entitled Enhanced Physical Layer Repeater for Operation in WIMAX Systems, which was filed on Mar. 30, 2007.

Figure 1B:
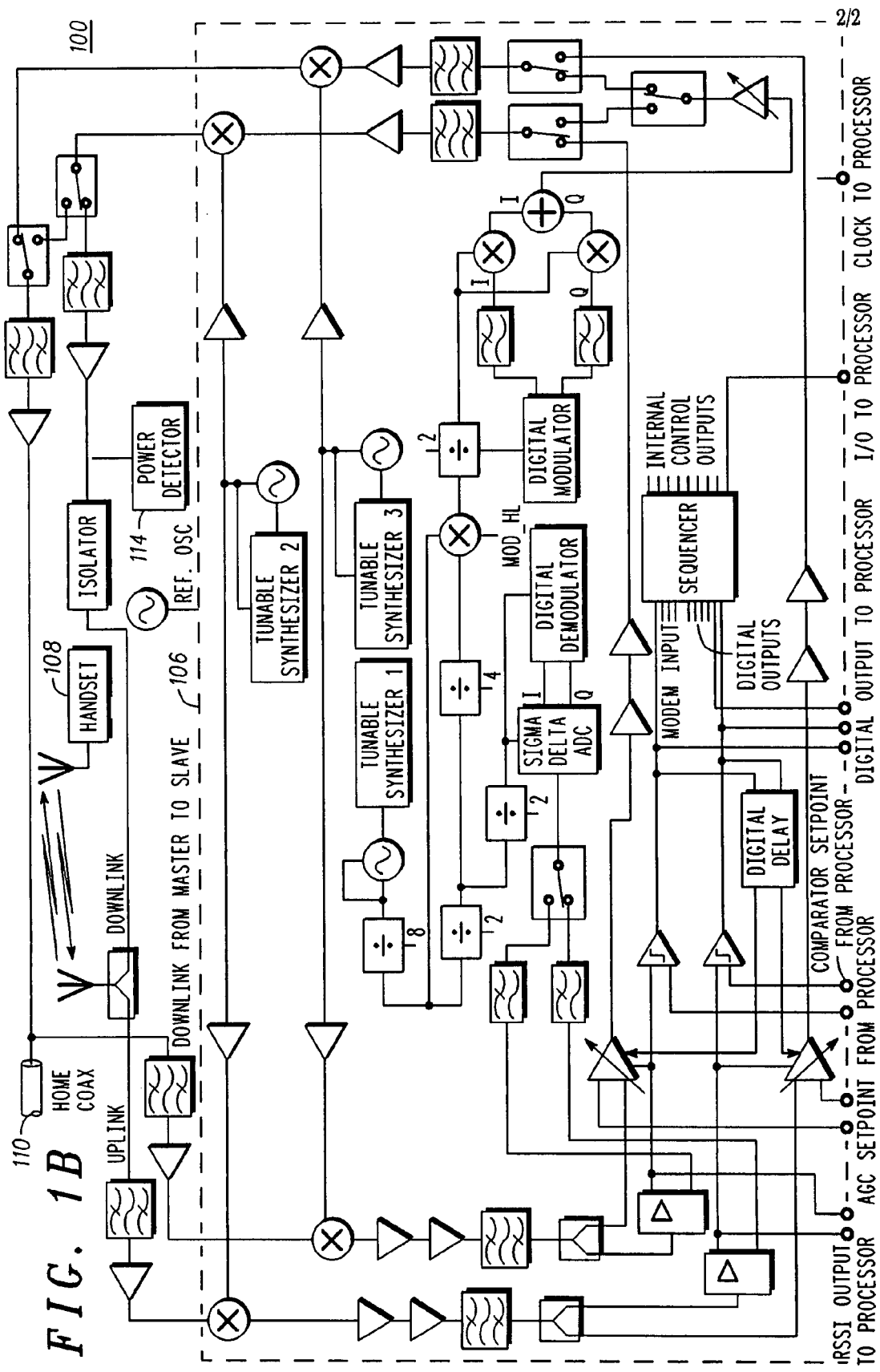

FIG. 1A and FIG. 1B show the architecture of a portion of the wireless repeater system 100 (also referenced more generally as a repeater) according to one exemplary embodiment, as well as other peripheral electronic components. The repeater system 100 includes two or more sub-units for implementing a master unit and a slave unit. The first sub-unit is configured as a master unit 102 for wirelessly communicating with a wireless base station 104 and will be referred to herein as a master unit 102. The master unit 102 is located in a room with coverage or physically outside of a room in a facility or similar structure in which extended wireless coverage is desired. The second sub-unit is configured as a slave unit 106 for wirelessly communicating with a subscriber terminal 108. It should be noted that the repeater 100 is not limited to including merely one slave unit. In practical implementation, the repeater 100 may include a plurality of sub-units for implementing a plurality of slave units distributed throughout the facility or similar structure in which extended wireless coverage is desired.

The master unit 102 is connected to the slave unit 106 through existing wiring 110 in the facility to enable the master unit 102 to transmit radio frequency (RF) signals such as cellular signals to the slave unit 106 on a downlink transport frequency and to receive cellular signals from the slave unit 106 on an uplink transport frequency in a manner that is transparent to the base station 104 and the subscriber terminal 108 and therefore in compliance with existing licensed spectrum communication standards. Both the master unit 102 and the slave unit 106 also include power detectors 112, 114, the function of which will be described below in more detail.

Figure 2:
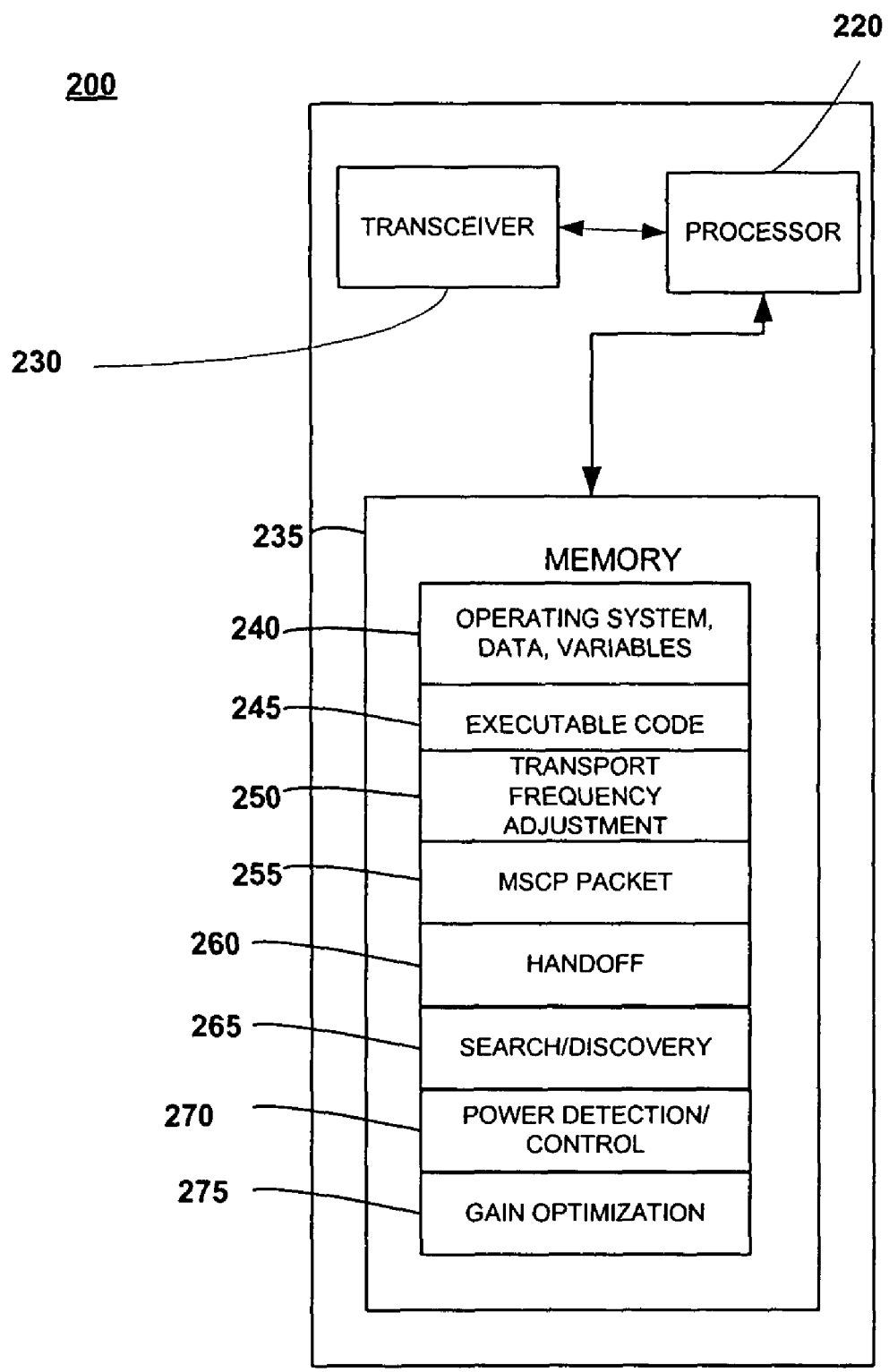
FIG. 2 is a schematic block diagram of portions of an exemplary slave or master unit.

FIG. 2 is an illustration of portions of the sub-units according to one exemplary embodiment. The sub-unit 200 can include a processor 220, a memory 235 coupled to the processor 220, and a transceiver 230 for coupling the processor 220 to external entities such as the base station 104 or the subscriber terminal 108. The transceiver 230 may include components shown in FIG. 1 such as antenna, modems and/or amplifiers. The transceiver 230 can further include a low pass filter associated with the existing wiring or cabling that physically connects the master unit and the slave unit at the point at which the existing wiring or cabling enters the house. The low pass filter would enable cable TV signals to be input into the facility and would filter out wireless signals, thereby preventing the wireless signals from exiting the home and being received by other like repeaters located in, for example, a multi-tenant dwelling.

The transceiver 230 can send and receive wireless signals to and from the wireless base station 104 or subscriber terminal 108. The transceiver 230 can further send and receive the wireless signals and master slave communication protocol (MSCP) packets on the downlink and uplink transport frequencies to another sub-unit such as another slave unit or a master unit over the existing wiring of the facility. The transceiver 230 will send the wireless signals to one of the base station and subscriber terminal and either the slave unit or the master unit depending upon if the sub-unit 200 is configured as a slave unit or a master unit.

The processor 220 can be one of a variety of different processors including general purpose processors, custom processors, controllers, compact eight-bit processors or the like. The memory 235 can be one or a combination of a variety of types of memory such as random access memory (RAM), read only memory (ROM), flash memory, dynamic RAM (DRAM) or the like. The memory 235 can include a basic operating system, data, and variables 240 and executable code 245. The memory 235 can further include computer programs (or executable instructions) for configuring the processor 220 to perform the tasks required of the sub-unit 200. Particularly, the memory 235 can include: transport frequency adjustment instructions 250; MSCP packet generation instructions 255; handoff instructions 260; search/discovery instructions 265, power detection/control instructions 270 and gain optimization instructions 275, each of which will be discussed in more detail below.

The transport frequency adjustment instructions 250 are for configuring the processor 220 to test and qualify the transport frequencies, and independently tune the uplink and downlink transport frequencies. The MSCP packet generation instructions 255 are for configuring the processor 220 to generate MSCP packets including operating parameters, notification of gap transmission times, broadcast messages, measured parameters, and other messages.

The handoff instructions 260 are for configuring the processor 220 to enable a soft handoff of a subscriber terminal between a sub-unit and another base station, between base stations, or between different sub-units. In CDMA systems, a soft handoff is a process whereby signals from more than one base station are received at the same time. Additionally, if signals from both the repeated and direct propagation paths are received by the subscriber terminal, theses signals may be combined using a CDMA Rake receiver. It is important that the frequency offset between these multiple signal sources have minimum frequency offsets. Particularly, the processor 220 can be configured to limit a frequency offset between signals of the two entities with which a subscriber unit is participating in a handoff activity.

The search/discovery instructions 265 are for configuring the processor 220 to configure the sub-unit 200 as either a master or slave unit. Particularly, the search/discovery instructions 265 can configure the sub-unit to be in a discovery mode (master unit) in which MSCP packets including time-stamped master broadcast messages are sent to other sub-units on the transport frequency, or can configure the sub-unit 200 to be in a search mode (slave unit) in which it listens for the master broadcast messages. The master broadcast messages can include operating parameters such as timing parameters, downlink master to slave transmission times, slave to master initial transmission times and an uplink random access time slot available for transmission.

The power detection/control instructions 270 are for configuring the processor 220 to set parameters such as Received Signal Strength Indication (RSSI) power detector thresholds on the uplink and downlinks based upon measured RSSI, noise levels and sub-unit input and output power, and to control the input and output power based upon the set parameters.

The gain optimization instructions 275 are for configuring the processor 220 to determine a maximum gain for either the uplink to the base station or the downlink to the subscriber terminal in which the master unit and the slave unit are not in an oscillation state.

Figure 3:
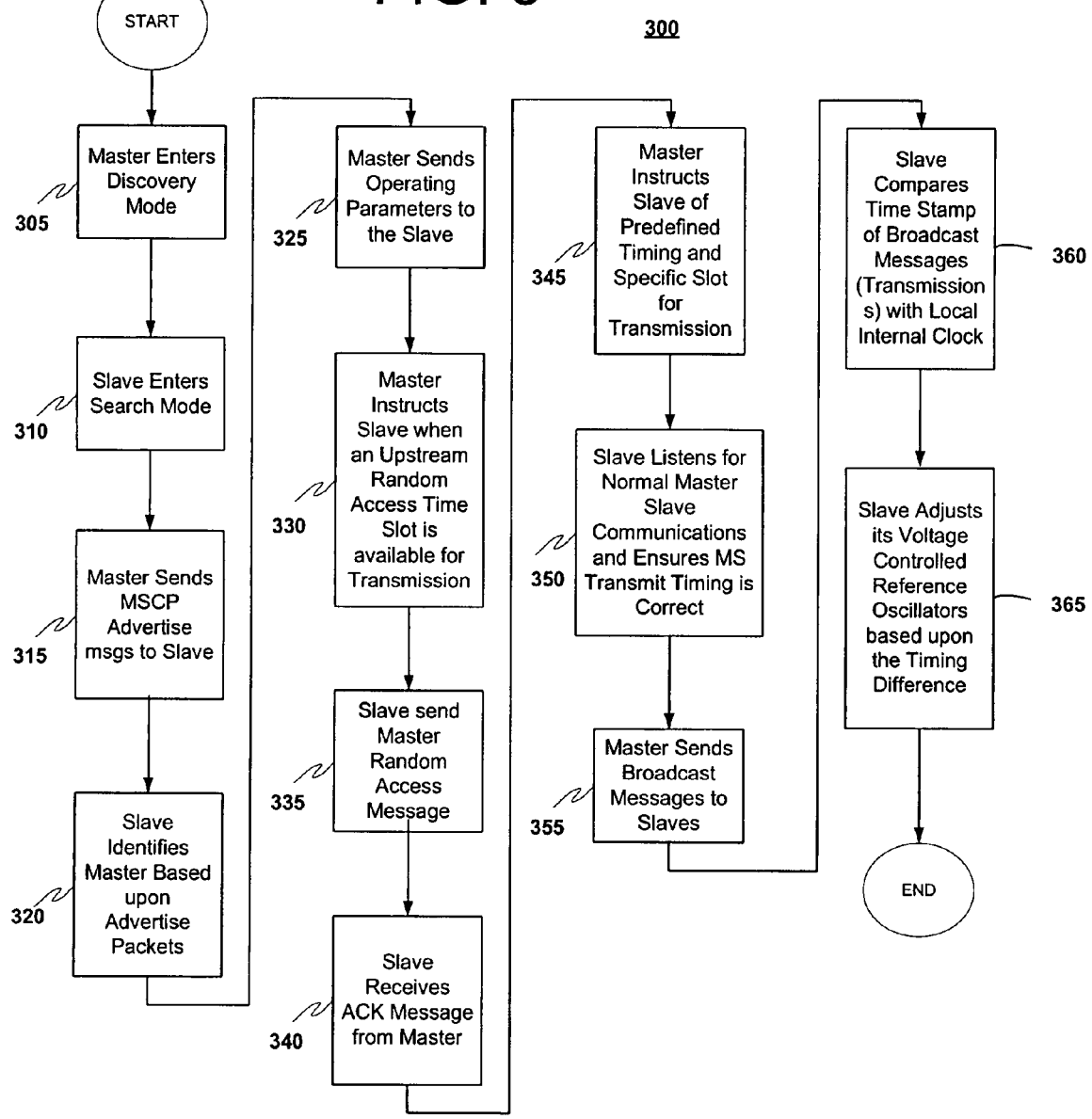
FIG. 3 is a flow diagram illustrating an exemplary procedure for setting up the master and slave units.

Referring to FIG. 3, an exemplary procedure 300 for setting up a repeater including two sub-units as a master unit and a slave unit will be discussed. At 305, a sub-unit intended to be configured as a master unit (hereafter master unit) is placed into a discovery mode, and at 310, another sub-unit intended to be configured as a slave unit (slave unit) is placed into a search mode. As will be discussed later in more detail, the sub-units can be placed into the discovery mode and the search mode by the user via a single button push procedure in which a user pushes a push button on the master unit to place it in the discovery mode and a push button on the slave unit to place it in the search mode.

At 315, the master unit sends MSCP packets including control messages such as master broadcast messages on a downlink transport frequency to the slave unit. Alternatively, here the master unit can be placed in a slave accept mode when the user depresses the push button on the master unit that will be timed out after a fixed amount of time. At 320, the slave unit receives the master broadcast messages, and identifies the master unit. At 325, the master unit sends another control message to the slave unit including operating parameters such as timing parameters, downlink master to slave transmission times, slave to master initial transmission times and an uplink random access time slot available for transmission.

At 330, the master unit sends MSCP packets including an instruction of when an upstream random access time slot is available for transmission to the slave unit. During this time, RF transmissions from the slave unit on the uplink transport frequency are terminated. These times may be used by the slave unit and the master unit for interference assessment as well as initial slave to master communication.

At 335, the slave unit sends MSCP packets including a random access message to the master unit over the uplink transport frequency. At 340, the slave unit receives an acknowledgement message from the master unit over the downlink transport frequency.

At 345, the master unit sends MSCP packets including an instruction of predefined timing and a specific time slot for the slave unit to transmit to the master unit. This specific time slot will be different from the random access time slot.

At 350, the slave unit listens for normal master slave communications to ensure that it has the master slave transmit timing correct. During this time, RF transmissions from the slave unit on the uplink transport frequency continue to be terminated.

At 355, the master unit sends MSCP packets including time-stamped broadcast messages to the slave unit or units on the downlink transport frequency to allow frequency timing adjustments in the slave unit. At 360, the slave unit determines a timing difference between a local processor clock and the master unit. Particularly, the slave unit can compare the internal clock running locally in the slave unit processor with the time stamped broadcast messages from the master unit over a long time base to determine the timing difference. At 365, the slave unit adjusts its voltage controlled reference oscillator based upon the timing difference to achieve the required accuracy. This allows the RF frequencies to be very close, i.e. <100 Hz different $(100/(2\times10^9)=1/(2\times10^{-7})=0.05\times10^6=0.05$ ppm) when the repeater is operating at 2 GHz.

Once the required timing and power accuracy is achieved, the slave unit is activated as are the slave unit transmitter/receiver activation procedures. The slave unit then transmits on the downlink, monitors master unit transmissions and monitors interference during off-puncture times. The procedure 300 for setting up the repeater can be performed by the processor 220 executing the search/discovery instructions 265.

Figure 4:
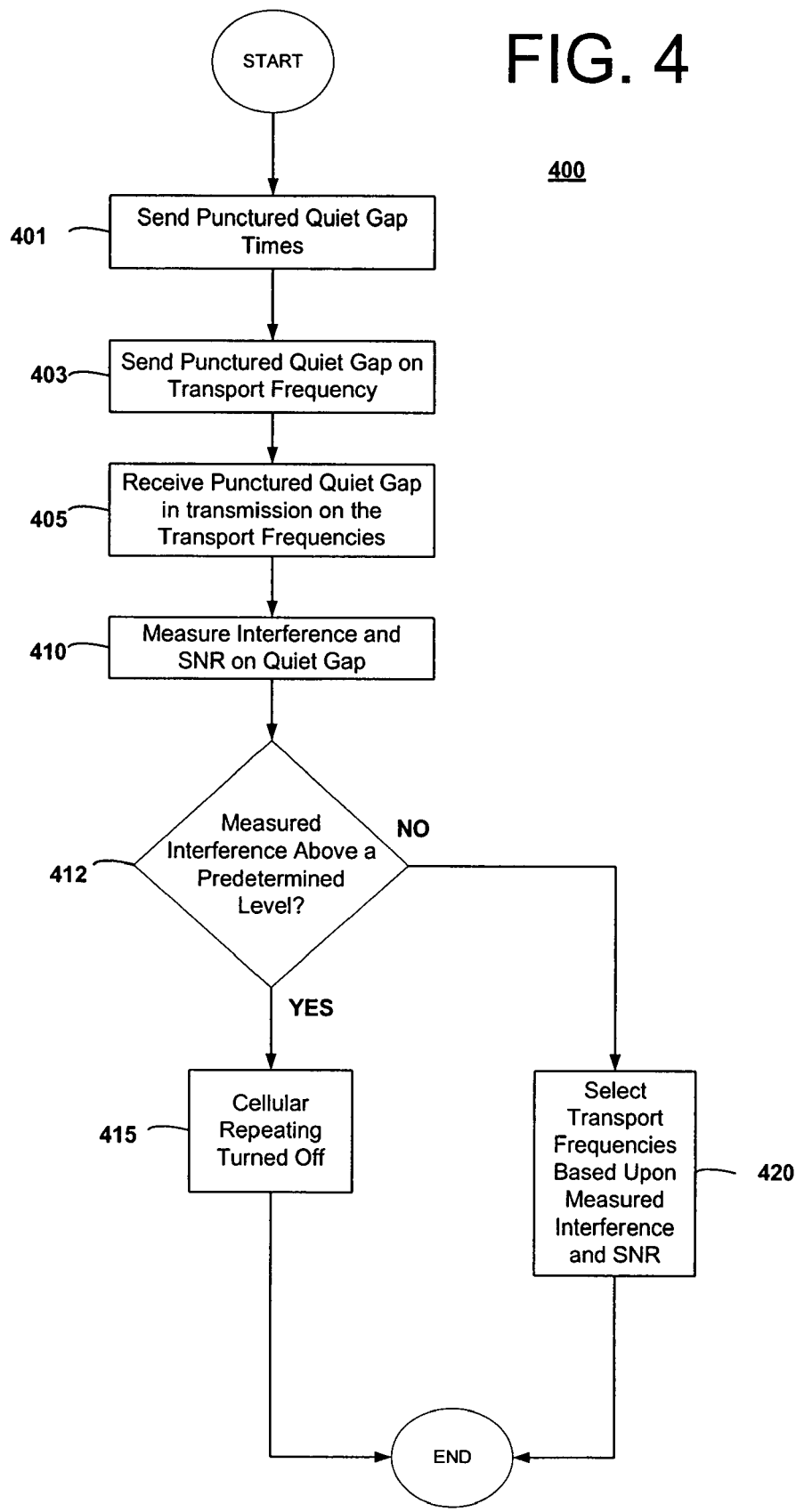
FIG. 4 is a flow diagram illustrating an exemplary procedure for adjusting the transport frequencies between the master and slave units.

Referring to FIG. 4, an exemplary procedure 400 for setting up or adjusting the transport frequencies between the master and slave units will be discussed. At 401, the master unit sends a notification message notifying of a downlink gap transmission time to the slave unit on the downlink transport frequency, and the slave unit sends a notification message notifying of an uplink gap transmission time to the master unit on the uplink transport frequency.

At 403, the master unit punctures the wireless signals on the downlink transport frequency with a downlink "quiet" gap at the downlink gap transmission time, and the slave unit punctures the wireless signals on the uplink transport frequency with an uplink "quiet" gap at the uplink gap transmission time. The master unit and the slave unit puncture the wireless signals according to a non-regular interval to prevent harmonic interference.

At 405, the master unit and the slave unit receive the downlink gap and the uplink gap on the respective transport frequencies. At 410, the master unit and the slave unit measure the interference levels and/or Signal to Noise Ratio (SNR) on the uplink and downlink transport frequencies based upon the "quiet" gaps. The slave unit can send a message including the measured interference level or SNR to the master unit.

At 412, the master unit determines if the measured interference levels and/or SNR are above a predetermined absolute level or a level relative to the desired signal present on the transport frequencies. If the measured interference levels and/or SNR are determined to be above the predetermined absolute level (YES at 412), then at 415 the wireless repeating can be turned off.

If the measured interference levels and/or SNR are determined to be above the predetermined absolute level (NO at 412), then at 420 the uplink and downlink transport frequencies are chosen based on minimal interference or predetermined SNR. The master unit can continually re-evaluate the interference levels to ensure interference is not re-transmitted over the wireless network.

During the MSCP packet transmission period, all slave units must turn off their RF transmitters, as these master unit packets are directly substituted into the transport signal by "puncturing" the wireless signal that is also transported on the transport frequency.

The procedure 400 for setting up or adjusting the transport frequencies between the master and slave units can be performed by the processor 220 executing the transport frequency adjustment instructions 250.

Figure 5:
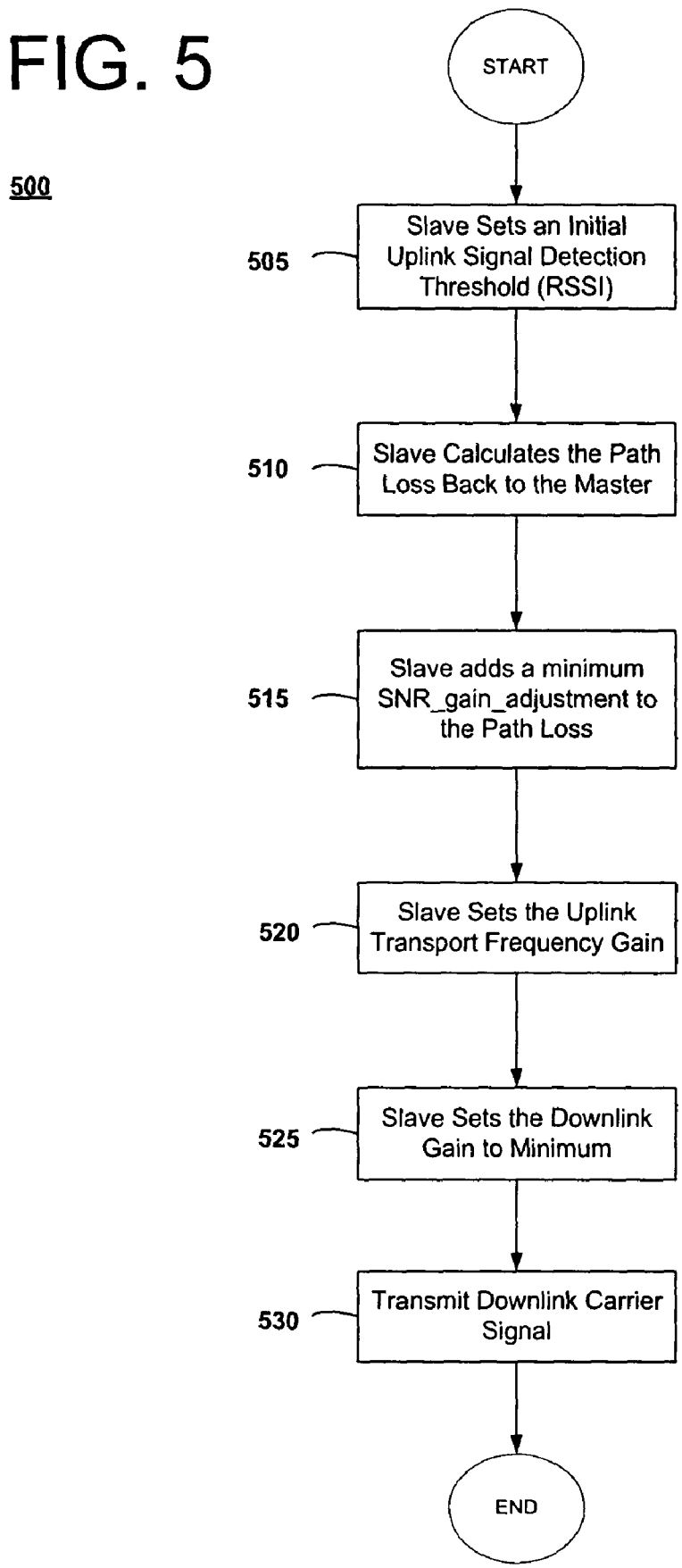
FIG. 5 is a flow diagram illustrating an exemplary procedure for controlling the power of the slave unit.

Referring to FIG. 5, an exemplary procedure 500 for controlling the power of the slave unit will be discussed. At 505, the slave unit measures a received signal strength indication (RSSI) and noise level of the uplink transport frequency, as well as an input and output power of the slave unit. The slave unit sets an initial uplink signal detection threshold (RSSI power detector threshold) based on these measured values and a desired probability of detection/false detection.

At 510, the slave unit calculates the path loss back to the master unit via the transport frequency and master slave packet exchanges. At 515, the slave unit adds a minimum SNR gain adjustment to that path loss. At 520, the slave unit sets the uplink transport frequency gain based upon the calculated path loss and SNR gain.

At 525, the slave unit then sets the downlink RF gain to a minimum level based upon what parameters is the downlink set to a minimum. At 530, the slave unit begins transmitting the carrier signal on the downlink to the subscriber terminal.

The procedure 500 for controlling the power of the slave unit can be performed by the processor 220 executing the power detection/control instructions 270.

Figure 6:
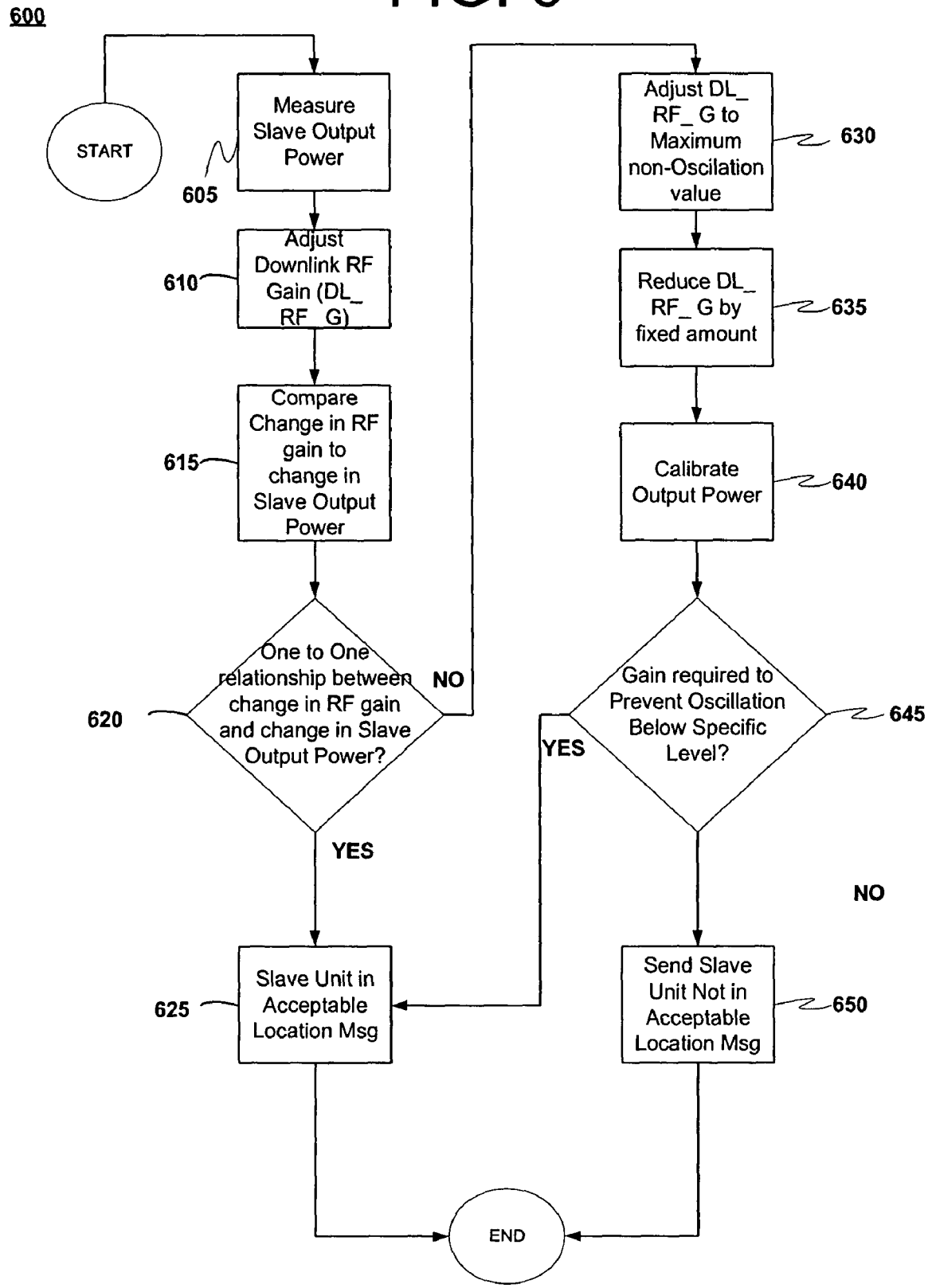
FIG. 6 is a flow diagram illustrating an exemplary procedure for monitoring master/slave oscillations and setting optimal gain.

Referring to FIG. 6, an exemplary procedure 600 for monitoring master/slave oscillations and setting optimal gain will be discussed. At 605, the slave unit measures the slave unit output power by, for example, the power detector 114. At 610, the slave unit adjusts the downlink RF gain (DL_RF_G) by, for example, adjusting the output power. At 615, the slave unit compares the change in RF gain with a change in the slave unit output power.

At 620, the slave unit determines if a change in the gain of the downlink to the subscriber terminal is substantially equal to a change in the measured output power. If the ratio of the changes is not substantially equal, then the master unit and the slave unit are likely in an oscillation state.

If the change in the gain of the downlink to the subscriber terminal is not substantially equal to a change in the measured output power (NO at 620), then at 630 the slave unit adjusts the downlink RF gain and compares the gain setting change with the measured output power change. The gain is adjusted in, for example, 1 dB stepped increments until it is at a maximum prior to oscillation. At 635, the slave unit reduces the downlink RF gain by an additional fixed amount. At 640, the slave unit calibrates the output power by periodically increasing and decreasing the output power and measuring the measured output power changes on an ongoing basis. That is, the slave unit determines a maximum gain of the downlink to the subscriber terminal for which the master unit and the slave unit are not in the oscillation state.

At 645, the slave unit determines if gain of the downlink to the subscriber terminal required to prevent oscillation is below a specific level. If the gain of the downlink to the subscriber terminal required to prevent oscillation is below the specific level (YES at 645) or if the change in the gain of the downlink to the subscriber terminal is determined to be substantially equal to a change in the measured output power (YES at 620), then at 625 the slave unit or the master unit can generate an indication message for the user indicating that the slave unit is in an acceptable location.

If the gain of the downlink to the subscriber terminal required to prevent oscillation is above the specific level (NO at 645), then at 650 the slave unit generates an indication message to be send to the master unit, and locally to the user, that the slave unit is not in an acceptable location. This approach can also potentially be used to determine the isolation between plural slave units. The procedure 600 for monitoring master/slave oscillations and setting optimal gain can be performed by the processor 220 executing the gain optimization instructions 275.

Figure 7:
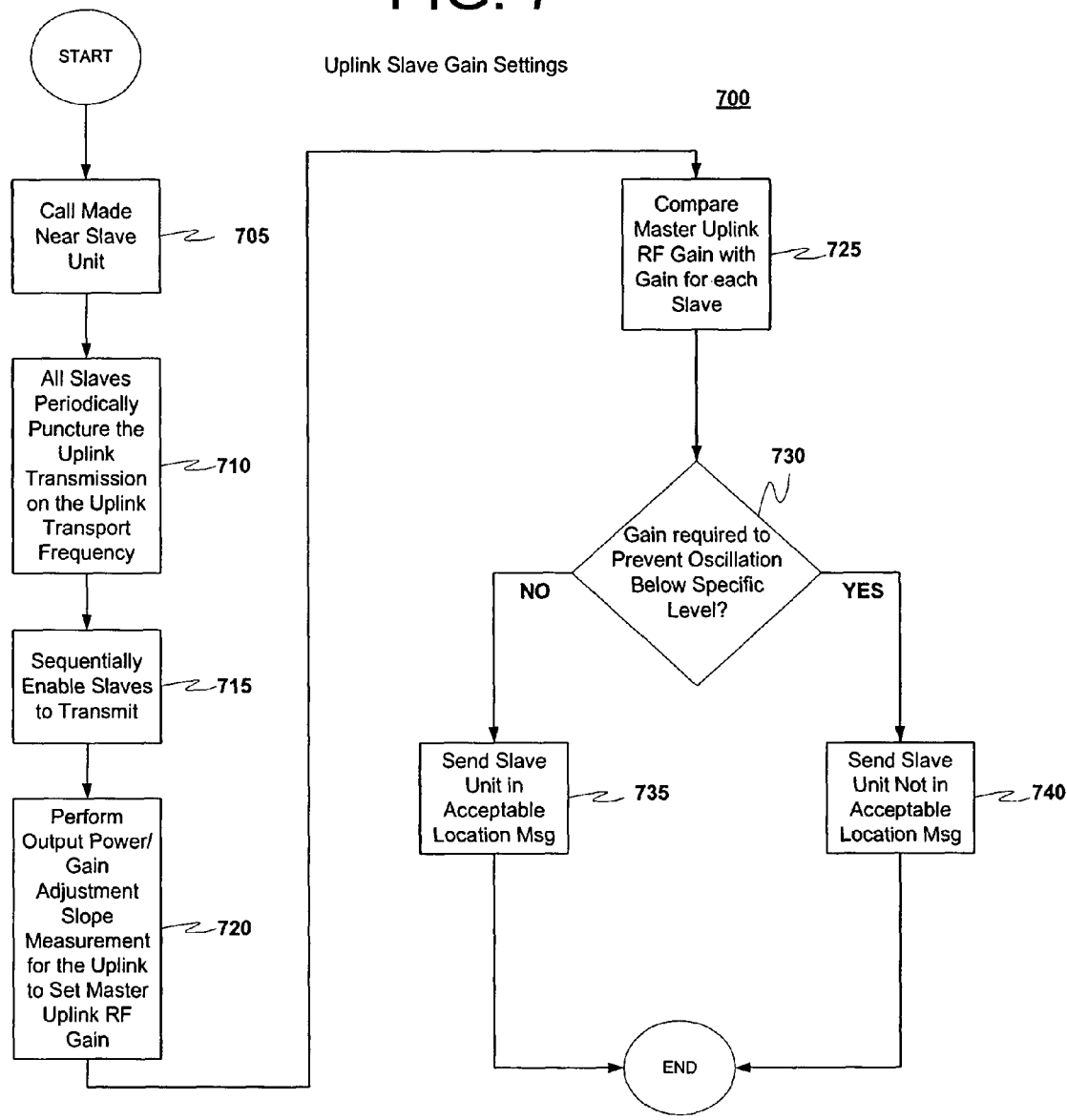
FIG. 7 is a flow diagram illustrating an exemplary procedure for optimizing uplink gain of the slave unit.

Referring to FIG. 7, an exemplary procedure 700 for setting the slave unit uplink gain will be discussed. At 705, a user of the subscriber terminal makes a call near the slave unit after initial set up. At 710, during the call, all slave units periodically puncture the uplink transmission on the uplink transport frequency with an uplink gap. At 715, the master unit sequentially enables each slave unit to transmit the uplink gap. That is, each slave unit is enabled for transmission one at a time.

At 720, the master unit performs an output power/gain adjustment slope measurement for the uplink to the base station in a similar manner to the process 600 performed by the slave unit. That is, the master unit determines a maximum gain of the uplink to the base station for which the master unit and the slave unit are not in an oscillation state in which a change in the gain of the uplink to the base station is not substantially equal to a change in the measured master unit power. Once the master unit uplink RF gain is set to a safe level to prevent oscillation, at 725 the master unit compares the master unit uplink RF gain with the gain required for all the other slave units for voice communication at a satisfactory level.

At 730, the master unit determines if the minimum gain of the uplink to the base station required to prevent oscillation for each of the slave units is below a specific level. If the gain required to prevent oscillation is below the specific level (YES at 730), then at 740 the master unit can generate an indication message to be sent to the slave unit, and locally to the user, that the slave unit is not in an acceptable location.

If the gain required to prevent oscillation is not below the specific level (NO at 730), then at 735 the master unit can generate an indication message to be sent to the slave unit, and locally to the user, that the slave unit is in an acceptable location.

The procedure 700 for setting the slave unit uplink gain can be performed by the processor 220 executing the gain optimization instructions 275.

Figure 8:
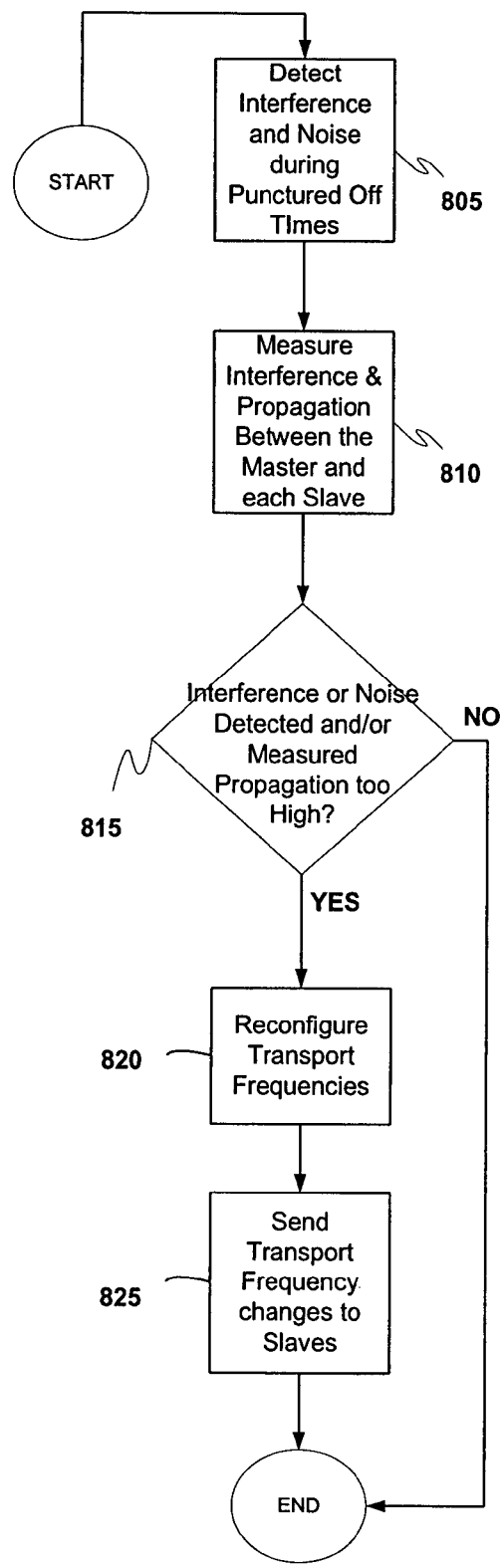
FIG. 8 is a flow diagram illustrating an exemplary procedure for measuring interference and noise on the transport frequencies.

Referring to FIG. 8, an exemplary procedure 800 for measuring interference and noise on the uplink and downlink transport frequencies will be discussed. The transport frequencies are tested and qualified by tuning the upstream and downstream transport frequencies independently.

At 805, the master unit detects noise and/or interference during an uplink gap punctured in the wireless signals between the master and slave units on the uplink transport frequency. Similarly, the slave unit detects noise and/or interference during a downlink gap punctured in the wireless signals between the master and slave units on the downlink transport frequency. The master unit and the slave unit can determine when the uplink gap and the downlink gap will be punctured in the wireless signals based upon a notification message included in MSCP packets received from the slave unit or the master unit.

At 810, the master unit measures the interference level and propagation on the uplink transport frequency based upon the uplink gap punctured in the wireless signals. The slave unit measures the interference level and propagation on the downlink transport frequency based upon the downlink gap punctured in the wireless signals. The slave unit can generate MSCP packets including the measured interference levels and report them to the master unit. The master unit performs periodic transport frequency channel scans in coordination with the slave unit during "punched off" times and maintains a table of the measured noise/interference on all available transport channels based on listening performed at the master units and reports from the slave units.

At 815, the master unit determines if the detected interference, detected noise or measured propagation is too high for satisfactory communication over the transport frequencies. If the detected interference, detected noise or the measured propagation is too high (YES at 815), then at 820 the master unit reconfigures the transport frequencies and at 825 sends the transport frequency changes to the slave unit. The above process can be repeated until the parameters are satisfactory for communication (NO at 815).

It should be noted that the MSCP packets and the wireless uplink and downlink signals are transported at the same time. The master unit coordinates the use of MSCP packets during gaps in transmission, if such gaps are present, to allow interference measurements. Also, the master unit coordinates the transmission timing for the MSCP packets to enable the master or slave units to turn off their re-transmission to prevent the packets from being transmitted over the wireless interface by using a pre-determined schedule, which may be either a non-regular or pseudorandom schedule, to coordinate the transmission times. The procedure 800 for measuring interference and noise on the uplink and downlink transport frequencies can be performed by the processor 220 executing the transport frequency instructions 250 and the MSCP packet instructions 255.

Figure 9:
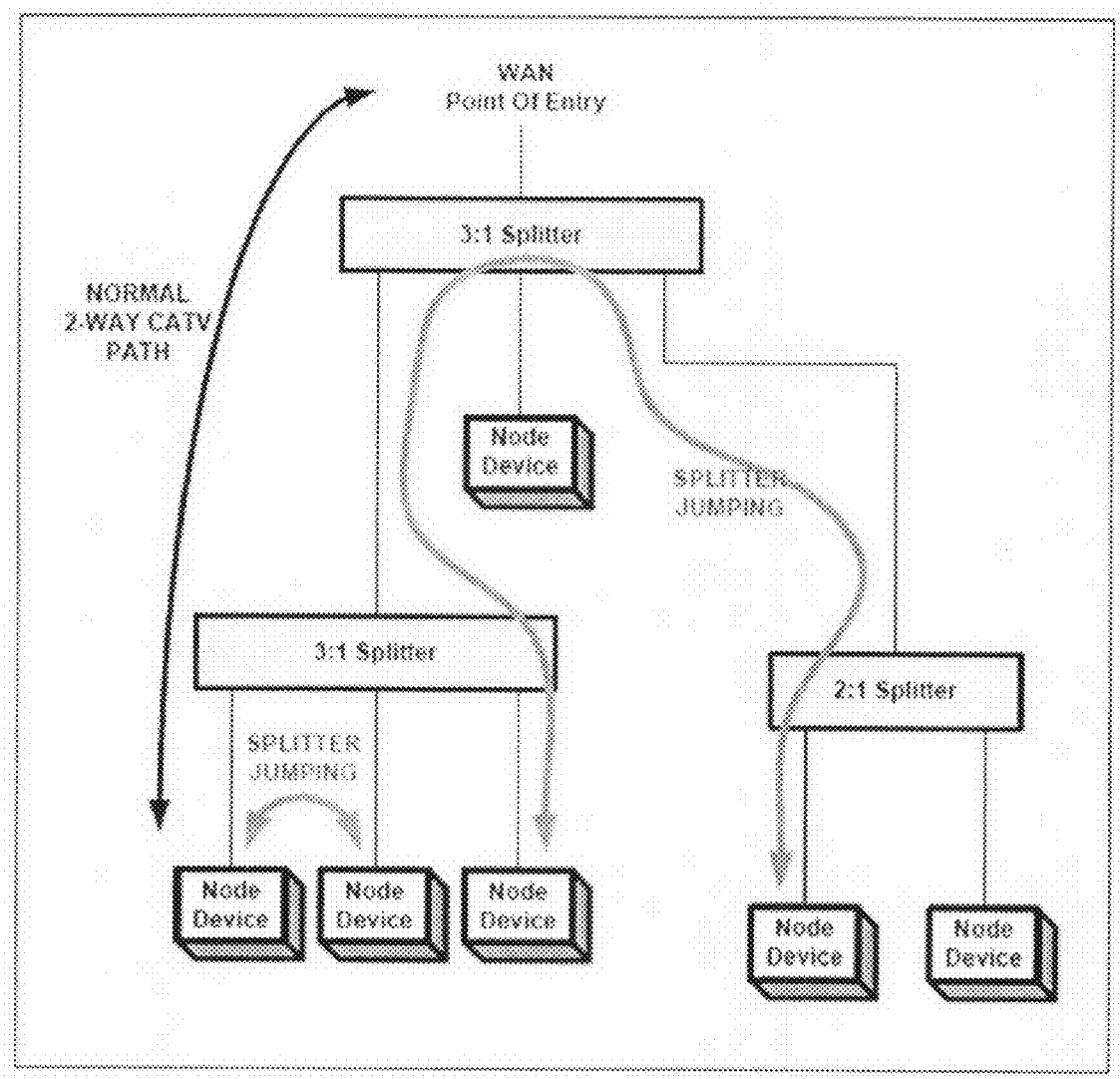
FIG. 9 is a schematic block diagram of exemplary coaxial cable interconnecting several rooms in a house as provided by the Multimedia over Coax Alliance (MoCA)

FIG. 9 illustrates an exemplary coaxial cable interconnecting several rooms in a house and is provided to illustrate how different paths over existing cabling or wiring will have different associated losses, noise and transport frequencies.

Figure 10:
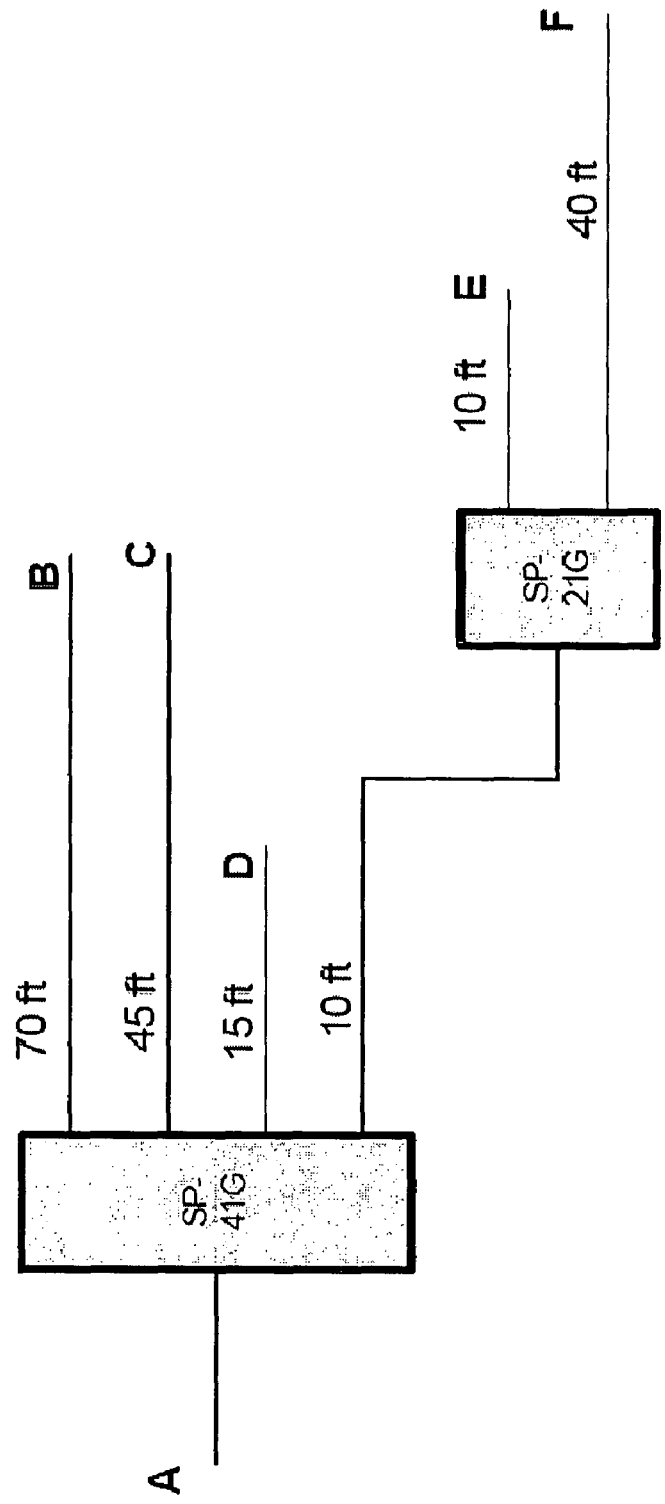
FIG. 10 is a schematic block diagram of another exemplary coaxial cable interconnecting several rooms in a house as provided by MoCA.
Figure 11A:
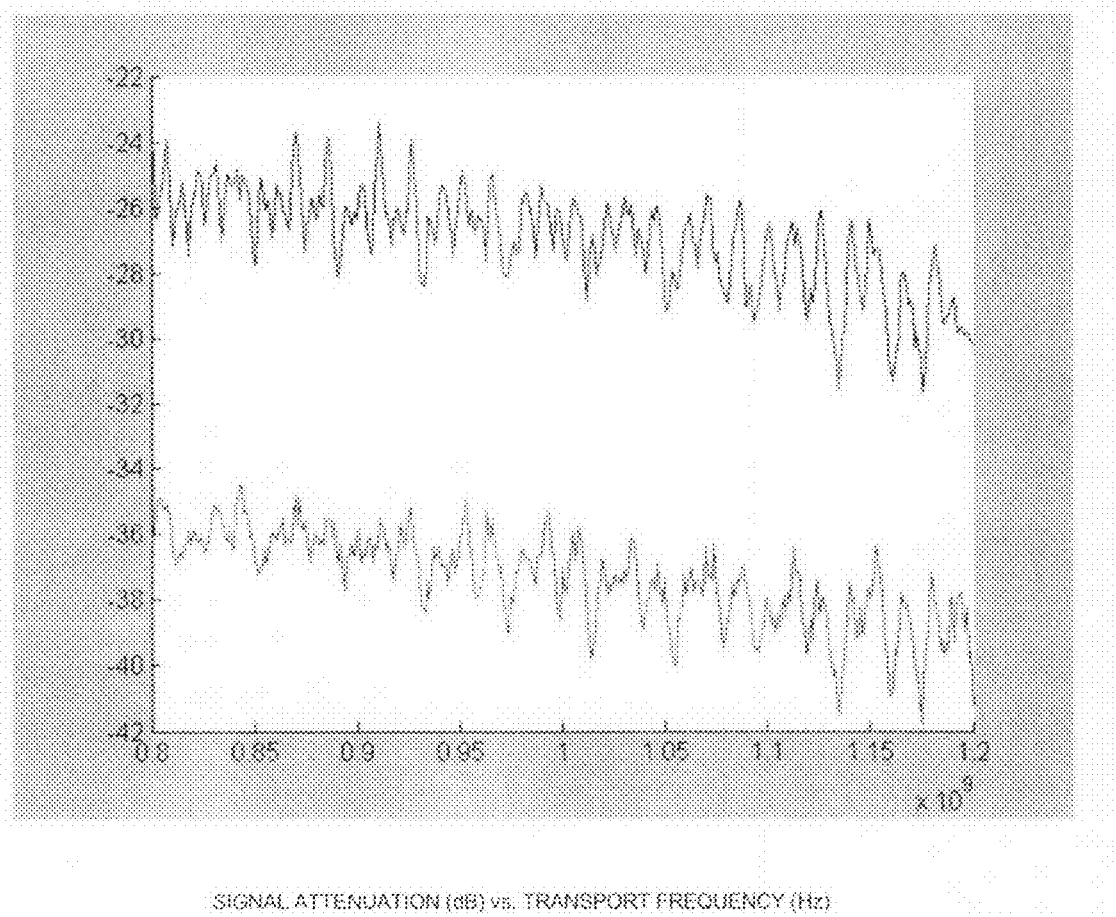
FIGS. 11A and 11B are graphs of frequency responses for respective long and short path transmissions over the coaxial cable illustrated in FIG. 10 as provided by MoCA.
Figure 11B:
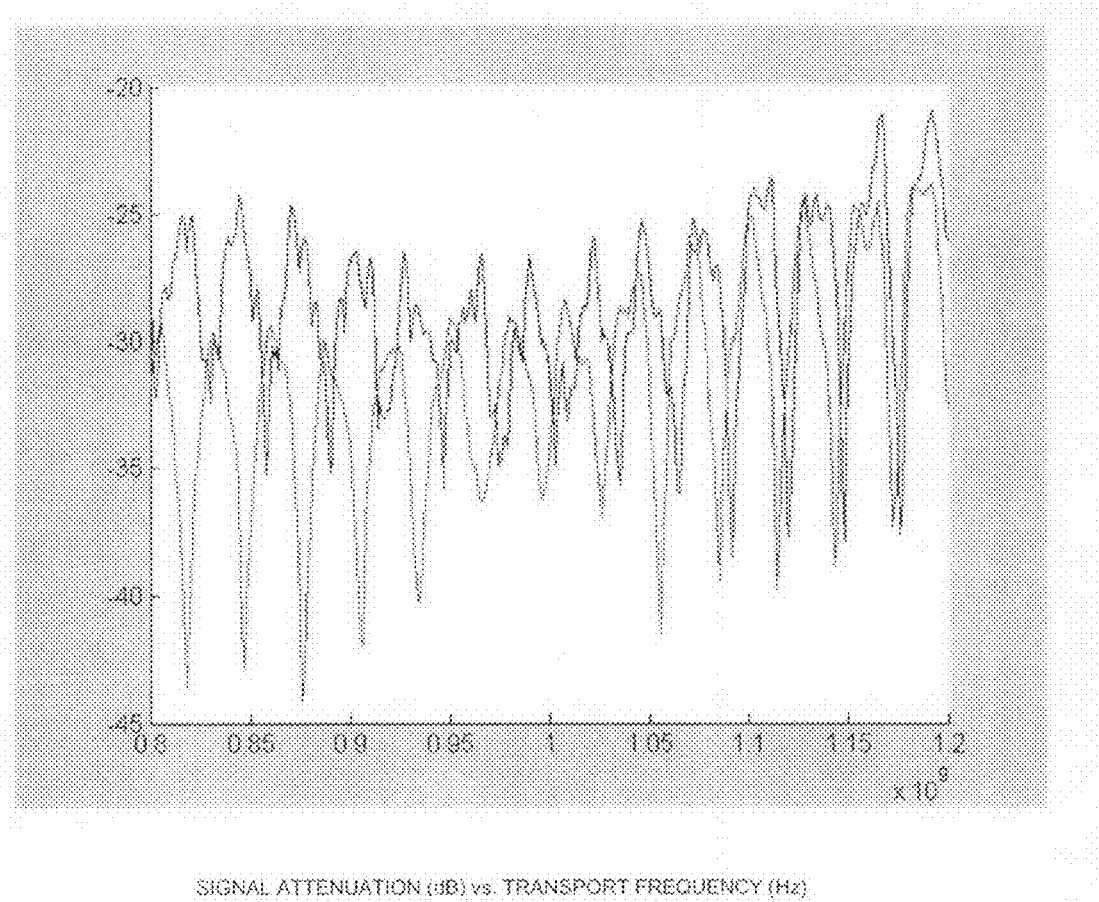

FIG. 10 illustrates several exemplary coaxial cable paths of varying lengths, while FIGS. 11A and 11B graphically illustrate frequency responses (signal attenuation vs. transport frequency) for long (F to B) and short (F to E) coaxial cable paths shown in FIG. 10. As can be appreciated by one skilled in the art, it is important to carefully determine appropriate transport frequencies, as certain frequencies result in higher signal attenuation than others.

Figure 12:
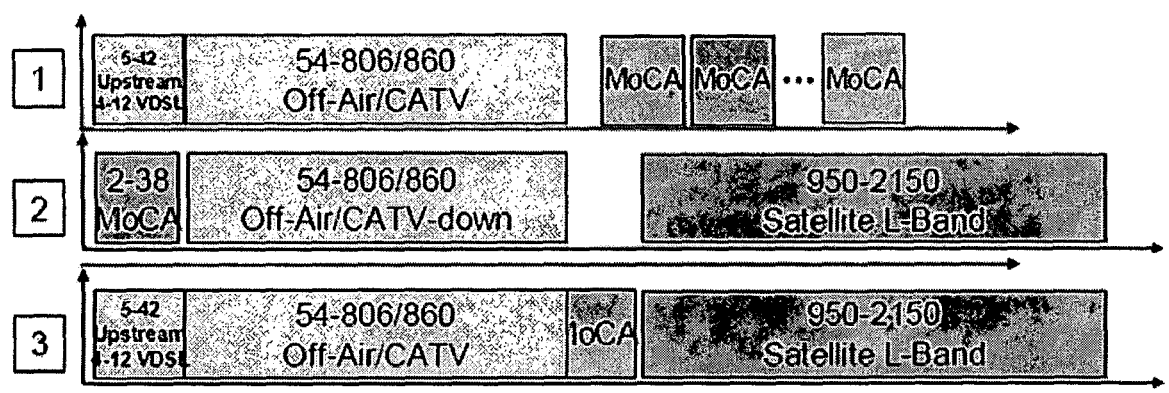
FIG. 12 is an exemplary diagram illustrating the respective bandwidths of other potentially existing services that must be avoided by the wireless repeater in FIG. 1.

FIG. 12 illustrates the operating frequencies of several services, some or all of which may be present in a facility in which the repeater described herein may be implemented. FIG. 12 serves to further illustrate the importance of selecting appropriate transport frequencies so as to avoid interference with transmit frequencies of existing services such as cable TV, MoCA and satellite TV transmissions.

Figure 13:
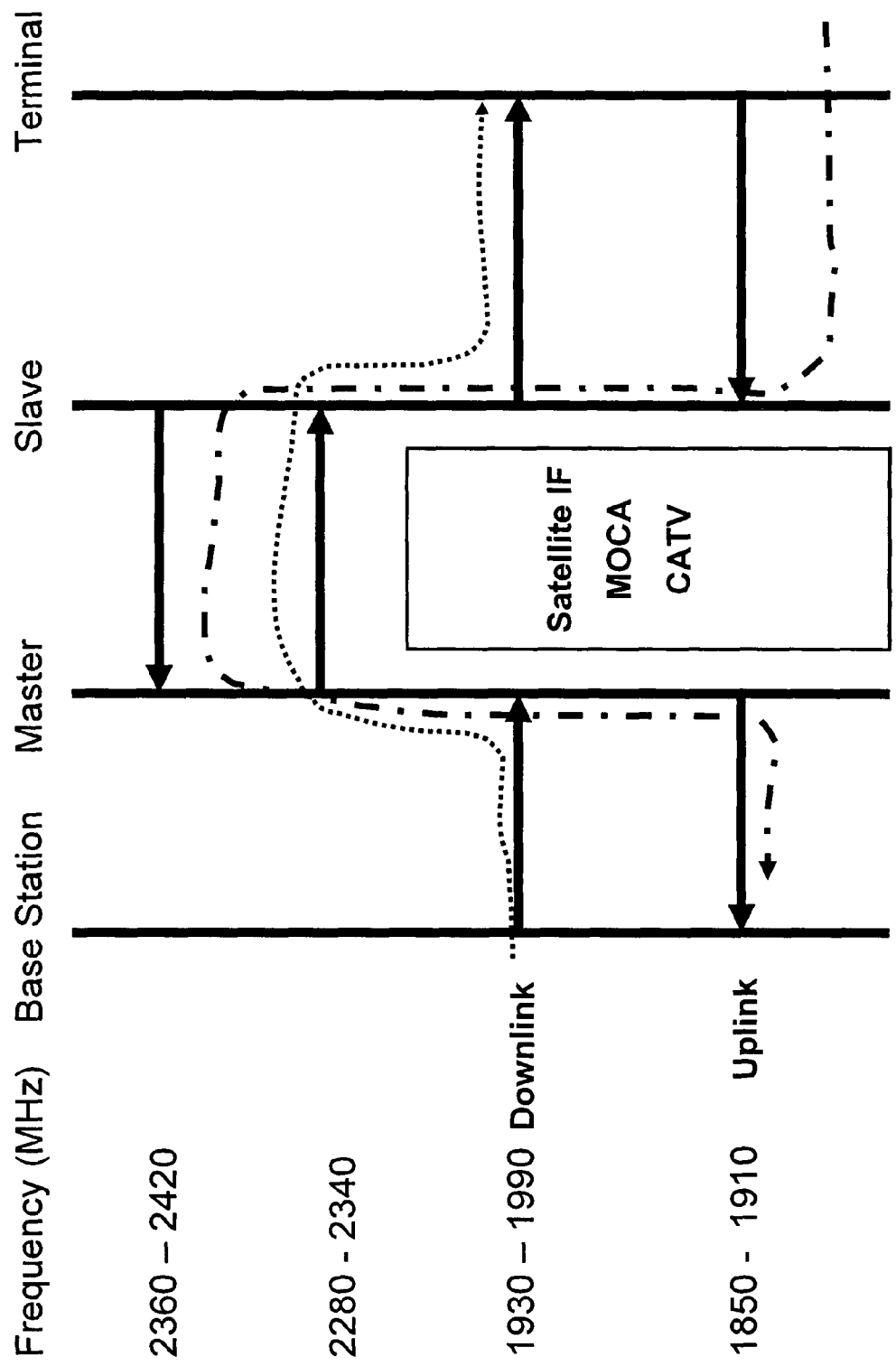
FIG. 13 is a diagram illustrating exemplary setup and installation of the repeater shown in FIG. 1.

Regarding master/slave unit configuration and installation, FIG. 13 is a diagram illustrating an exemplary setup and installation of the repeater shown in FIG. 1. The user places the slave unit in the room with poor coverage and connects it to power and the cable outlet. The user then presses a button on the slave unit to put it into "set up mode" for a fixed period of time (10 min). The user uses a cell phone or other wireless communication device to determine a room with coverage using the bars on the device. The user places the master unit in this room, and connects it to power and the cable outlet. The user presses a button on the master unit which puts it into "set up mode" for a fixed time period (10 min). The user then makes a phone call on their cell phone while near the master unit. The "configured light" on the master unit will turn on indicating the configuration is complete. The user should then walk to the slave unit and see the increased coverage or performance in this area.

Figure 14:
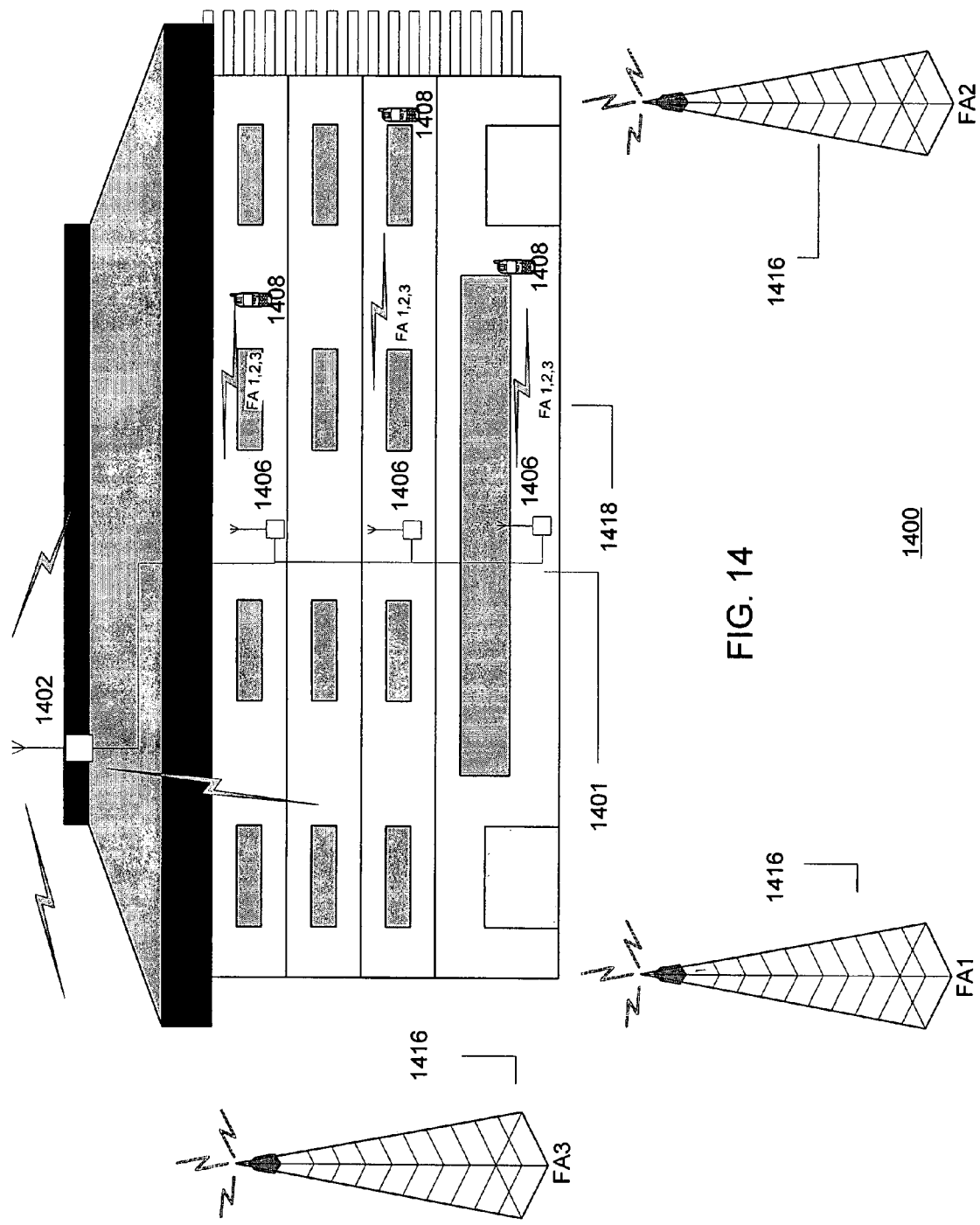
FIG. 14 is a system diagram of another exemplary wireless repeater system including multiple slave units.

FIG. 14 is a system diagram illustrating another exemplary embodiment of a repeater system 1400 in which a single cable, such as coaxial cable, 1401 is used to connect a master unit 1402 with multiple slave units 1406. The master unit 1402 and each of the slave units have an architecture such as that shown in FIG. 1A and FIG. 1B. However, each of the slave units 1406 is coupled to the cable 1401 via a coupler or splitter of the type well known in the art and therefore not specifically shown. The system 1400 finds particular application in, for example, a multi-tenant dwelling in which wireless communication devices, such as handsets 1408, are associated with different service providers, represented as base stations 1416 operating over frequency allocations FA1, FA2 and FA3. Although FIG. 14 illustrates only one slave unit, and therefore only one coupler or splitter, is located on each floor, multiple couplers or splitters may actually be located on each floor depending upon the number of slave units necessary to extend the wireless area of coverage.

Implementation of the repeater system 1400 is possible due to the ability of the master unit 1402 and slave units 1406 to communicate with each other through the use of MSCP packets as previously discussed, and specifically due to the use of a single IF on each of the up and down frequencies in FDD based systems or a single IF for both the up and down frequencies in TDD based systems. The repeater system 1400 can be used in environments in which new cabling is utilized and provides many advantages over conventional systems using a single cable concept. For example, conventional systems do not have a master unit and slave units capable of communicating with one another, do not communicate using an IF, and typically require one cable per slave unit. While the system shown in FIG. 1A and FIG. 1B utilizes IFs at relatively high frequencies where dedicated cabling is used, much lower IFs, such as in the 400-600 MHz range, may be used in the system 1400, thereby enabling less expensive cabling to be used.

Additional modifications to the above embodiments are also possible. For example, a repeater unit may be designed with a switch to be manipulated by a user that enables the unit to be either a master unit or a slave unit, depending on the position of the switch. A user may select one master, and then all the other units in the user's home would be slaves.

Also, if auto setup of the master and slave units is desired, then the concept of making sure the master unit (for example the unit placed in or next to a window that showed the strongest RSSI on the user's handset or terminal) is on first so that when it does a scan it sees no other unit. As a result, the master unit will know it is to be the master unit and then as other slave units come on-line they will determine that the unit in the window is the master unit and will therefore join the network as slave units.

Further, it is contemplated that a slave unit may be associated with a specific master unit by manipulating one or more switches on the slave unit (similar to how a garage door opener is affiliated with a particular garage door unit) or by moving slave units into close proximity to the master unit and pressing a button which would cause the slave unit to find the strongest master unit. This would be necessary in a multi-tenant dwelling (MTD).

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated.

What is claimed is:

1. In a repeater to augment wireless network communication coverage in a facility, a master unit configured to couple to at least one slave unit via wiring in the facility, the master unit comprising:
   a processor configured to generate master slave communication protocol (MSCP) packets;
   a transceiver coupled to the processor configured to send and receive wireless signals to and from a wireless base station associated with a wireless communication network, the transceiver further configured to send and receive the wireless signals and the MSCP packets on a downlink transport frequency to the slave unit and on an uplink transport frequency from the slave unit over the wiring in the facility, wherein the processor is further configured to:
   puncture the wireless signals on the downlink transport frequency with a downlink gap so that interference levels on the downlink transport frequency can be measured by the slave unit;
   measure the remaining signal level on the uplink transport frequency based upon an uplink gap punctured in the wireless signals on the uplink transport frequency; and adjust the downlink and uplink transport frequencies based upon measured remaining signal levels.

2. The master unit of claim 1, further comprising the wiring in the facility, and wherein the wiring comprises existing wiring in the facility.

3. The master unit of claim 1, wherein the processor is further configured to determine when the uplink gap will be punctured in the wireless signals based upon a notification message included in the MSCP packets received from the slave unit.

4. The master unit of claim 1, wherein the processor is further configured to puncture the wireless signals with the downlink gap according to a non-regular interval to prevent harmonic interference.

5. In a repeater to augment wireless network communication coverage in a facility, a master unit configured to couple to at least one slave unit via wiring in the facility, the master unit comprising:
a processor configured to generate master slave communication protocol (MSCP) packets;
a transceiver coupled to the processor to send and receive wireless signals to and from a wireless base station associated with a wireless communication network, the transceiver further configured to send and receive the wireless signals and the MSCP packets on a downlink transport frequency to the slave unit and on an uplink transport frequency front the slave unit over the wiring in the facility; and
a power detector coupled to the transceiver, the power detector measuring a received signal strength indication (RSSI) and noise level of the downlink transport frequency with the slave unit, a master unit input power and a master unit output power, wherein the processor is further configured to determine a maximum gain of an uplink to the base station for which the master unit and the slave unit are not in an oscillation state, and in which a change in a gain of the uplink to the base station is not substantially equal to a change in measured master unit power.

6. The master unit of claim 5, wherein the processor is further configured to generate an indication message to be sent to the slave unit if a maximum gain of the uplink to the base station for which the master unit and the slave unit are not in the oscillation state is determined to be below a specific level.

7. In a repeater to augment wireless network communication coverage in a facility, a slave unit configured to couple to a master unit via wiring in the facility, the slave unit comprising:
a processor coupled to the transceiver and configured to configure the slave unit based upon operating parameters received in master slave communication protocol (MSCP) packets from the master unit; and
a transceiver to send and receive wireless signals on a downlink to and an uplink from a subscriber terminal over a wireless connection, the transceiver further to send and receive the wireless signals and MSCP packets on an uplink transport frequency to the master unit and on a downlink transport frequency from the master unit over the wiring in the facility wherein the processor is further configured to:
puncture the wireless signals on the uplink transport frequency with an uplink gap so that remaining signal levels on the uplink transport frequency can be measured by the master unit;
measure a remaining signal level on the downlink transport frequency based upon a downlink gap punctured in the wireless signals on the downlink transport frequency; and
generate the MSCP packets including the measured interference levels to be sent to the master unit.

8. The slave unit of claim 7, wherein the processor is further configured to determine when the downlink gap will be punctured in the wireless signals based upon a notification message included in the MSCP packets received from the master unit.

9. The slave unit of claim 7, wherein the processor is further configured to puncture the wireless signals on the uplink transport frequency with the uplink gap according to a non regular interval.

10. In a repeater to augment wireless network communication coverage in a facility, a slave unit configured to couple to a master unit via wiring in the facility, the stave unit comprising:
a processor coupled to the transceiver and configured to configure the slave unit based upon operating parameters received in master slave communication protocol (MSCP) packets from the master unit; and
a transceiver to send and receive wireless signals on a downlink to and an uplink from a subscriber terminal over a wireless connection, the transceiver further to send and receive the wireless signals and MSCP packets on an uplink transport frequency to the master unit and on a downlink transport frequency from the master unit over the wiring in the facility wherein the processor is further configured to:
determine a timing difference between a local clock and a clock associated with the master unit based upon one or more time-stamped broadcast messages within the MSCP packets received from the master unit; and
adjust the local clock reference based on the timing difference.

11. In a repeater to augment wireless network communication coverage in a facility, a slave unit configured to couple to a master unit via wiring in the facility, the slave unit comprising:
a processor coupled to the transceiver and configured to configure the slave unit based upon operating parameters received in master slave communication protocol (MSCP) packets from the master unit;
a transceiver to send and receive wireless signals on a downlink to and an uplink from a subscriber terminal over a wireless connection, the transceiver further to send and receive the wireless signals and MSCP rackets on an uplink transport frequency to the master unit and on a downlink transport frequency from the master unit over the wiring in the facility; and
a power detector coupled to the transceiver, the power detector configured to measure a received signal strength indication (RSSI), a noise level of the uplink transport frequency with the master unit, a slave unit input power and a slave unit output power, wherein the processor is further configured to determine a maximum gain of the downlink to the subscriber terminal for which the slave unit and the master unit are not in an oscillation state in which a change in a gain of the downlink to the subscriber terminal is not substantially equal to a change in a measured slave unit output power.

12. The slave unit of claim 11, wherein the processor is further configured to generate an indication message to be sent to the master unit if the maximum gain of the downlink to the subscriber terminal for which the slave unit and the master unit are not in the oscillation state is determined to be below a specific level.

13. A method of augmenting wireless network communication coverage in a facility including a master unit installed at the facility and a slave unit coupled to the master unit via wiring in the facility, the method comprising:
    sending control messages on a downlink transport frequency to the slave unit, the control messages including operating parameters for configuring the slave unit and a downlink gap transmission time;
    receiving control messages on an uplink transport frequency from the slave unit, the control messages including an uplink gap transmission time;
    sending wireless signals received at the master unit from a wireless base station to the slave unit via the downlink transport frequency;
    sending wireless signals received at the slave unit from a subscriber terminal to the master unit via the uplink transport frequency;
    puncturing the wireless signals sent via the downlink transport frequency with the downlink gap so that interference levels on the downlink transport frequency can be measured by the slave unit;
    puncturing the wireless signals sent via the uplink transport frequency with the uplink gap so that interference levels on the uplink transport frequency can be in measured by the master unit; and
    adjusting the downlink and uplink transport frequencies based upon the measured interference levels.

14. The method of claim 13, wherein the puncturing of the wireless signals sent via the downlink transport frequency and the puncturing of the wireless signals sent via the uplink transport frequency further includes puncturing the wireless signals according to a non-regular interval.

15. The method of claim 13, further comprising de-activating the master unit and the slave unit if the measured interference levels are greater than a predetermined level.

16. The method of claim 13, further comprising:
    sending time-stamped broadcast messages on the downlink transport frequency to the stave unit;
    determining a timing difference between a slave unit processor clock and a clock associated with the master unit based upon the time-stamped broadcast messages; and
    adjusting the slave unit processor clock if the timing difference is greater than a predetermined accuracy level.

17. The method of claim 13, further comprising:
    measuring a received signal strength indication (RSSI) and a noise level of the downlink transport frequency, and an input and output power of the master unit; and
    determining a maximum gain of the uplink to the base station for which the master unit and the slave unit are not in an oscillation state in which a change in the gain of the uplink to the base station is not substantially equal to a change in the measured master unit output power.

18. The method of claim 13, further comprising:
    generating an indication message to be sent to the slave unit if the maximum gain of the uplink to the base station for which the master unit and the slave unit are not in the oscillation state is determined to be below a specific level.

19. The method of claim 13, further comprising:
    measuring a received signal strength indication (RSSI) and a noise level of the uplink transport frequency, and an input and output power of the slave unit; and
    setting a gain of the uplink transport frequency based upon the measured received RSSI and noise level of the uplink.

20. The method of claim 13, further comprising:
    determining a maximum gain of the downlink to the subscriber terminal for which the slave unit and the master unit are not in an oscillation state in which a change in the gain of the downlink to the subscriber terminal is not substantially equal to a change in the measured output power of the slave unit.

21. The method of claim 20, further comprising generating an indication message to be sent to the master unit if the maximum gain of the downlink to the subscriber terminal for which the slave unit and the master unit are not in the oscillation state is determined to be below a specific level.

22. An apparatus for of augmenting wireless network communication coverage in a facility including a master unit installed at the facility and slave unit coupled to the master unit via wiring in the facility, the apparatus comprising:
    means for sending control messages on a downlink transport frequency to the slave unit, the control messages including operating parameters for configuring the slave unit and a downlink gap transmission time;
    means for receiving control messages on an uplink transport frequency from the slave unit, the control messages including an uplink gap transmission time;
    means for sending wireless signals received at the master unit from a wireless base station to the slave unit via the downlink transport frequency;
    means for sending wireless signals received at the slave unit from a subscriber terminal to the master unit via the uplink transport frequency;
    means for puncturing the wireless signals sent via the downlink transport frequency with the downlink gap so that interference levels on the downlink transport frequency can be measured by the slave unit;
    means for puncturing the wireless signals sent via the uplink transport frequency with the uplink gap so that interference levels on the uplink transport frequency can be measured by the master unit; and
    means for adjusting the downlink and uplink transport frequencies based upon the measured interference levels.

23. The apparatus of claim 22, wherein the puncturing of the wireless signals sent via the downlink transport frequency and the puncturing of the wireless signals sent via the uplink transport frequency further includes means for puncturing the wireless signals according to a non-regular interval.

24. The apparatus of claim 22, further comprising:
    means for de-activating the master unit and the slave unit if the measured interference levels are greater than a predetermined level.

25. The apparatus of claim 22, further comprising:
    means for sending time-stamped broadcast messages on the downlink transport frequency to the slave unit;
    means for determining a timing difference between a slave unit processor clock and a clock associated with the master unit based upon the time-stamped broadcast messages; and
    means for adjusting the slave unit processor clock if the timing difference is greater than a predetermined accuracy level.

26. The apparatus of claim 22, further comprising:
    means for measuring a received signal strength indication (RSSI) and a noise level of the downlink transport frequency, and an input and output power of the master unit; and means for determining a maximum gain of the uplink to the base station for which the master unit and the slave unit are not in an oscillation state in which a change in the gain of the uplink to the base station is not substantially equal to a change in the measured master unit output power.

27. The apparatus of claim 22, further comprising:
means for generating an indication message to be sent to the slave unit if the maximum gain of the uplink to the base station for which the master unit and the slave unit are not in the oscillation state is determined to be below a specific level.

28. The apparatus of claim 22, further comprising:
means for measuring a received signal strength indication (RSSI) and a noise level of the uplink transport frequency, and an input and output power of the slave unit; and
means for setting a gain of the uplink transport frequency based upon the measured received RSSI and noise level of the uplink.

29. The apparatus of claim 22, further comprising:
means for determining a maximum gain of the downlink to the subscriber terminal for which the slave unit and the master unit are not in an oscillation state in which a change in the gain of the downlink to the subscriber terminal is not substantially equal to a change in the measured output power of the slave unit.

30. The apparatus of claim 29, further comprising:
means for generating an indication message to be sent to the master unit if the maximum gain of the downlink to the subscriber terminal for which the slave unit and the master unit are not in the oscillation state is determined to be below a specific level.

31. A computer readable media comprising executable instructions for augmenting wireless network communication coverage in a facility in eluding a master unit installed at the facility and a slave unit coupled to the master unit via wiring in the facility, comprising:
instructions to send control messages on a downlink transport frequency to the slave unit, the control mess ages including operating parameters for configuring the slave unit and a downlink gap transmission time;
instructions to receive control messages on an uplink transport frequency from the slave unit, the control messages including an uplink gap transmission time;
instructions to send wireless signals received at the master unit front a wireless base station to the slave unit via the downlink transport frequency;
instructions to send wireless signals received at the slave unit from a subscriber terminal to the master unit via the uplink transport frequency;
instructions to puncture the wireless signals sent via the downlink transport frequency with the downlink gap so that interference levels on the downlink transport frequency can be measured by the slave unit;
instructions to puncture the wireless signals sent via the uplink transport frequency with the uplink gap so that interference levels on the uplink transport frequency can be measured by the master unit; and
instructions to adjust the downlink and uplink transport frequencies based upon the measured interference levels.

32. The computer readable media of claim 31, further comprising:
instructions to measure a received signal strength indication (RSSI) and a noise level of the downlink transport frequency, and an input and output power of the master unit; and
instructions to determine a maximum gain of the uplink to the base station for which the master unit and the slave unit are not in an oscillation state in which a change in the gain of the uplink to the base station is not substantially equal to a change in the measured master unit output power.

33. The computer readable media of claim 31, further comprising:
instructions to generate an indication message to be sent to the slave unit if the maximum gain of the uplink to the base station for which the master unit and the slave unit are not in the oscillation state is determined to be below a specific level.

34. The computer readable media of claim 31, further comprising:
instructions to measure a received signal strength indication (RSSI) and a noise level of the uplink transport frequency, and an input and output power of the slave unit; and
instructions to set a gain of the uplink transport frequency based upon the measured received RSSI and noise level of the uplink.

35. The computer readable media of claim 31, further comprising:
instructions to determine a maximum gain of the downlink to the subscriber terminal for which the slave unit and the master unit are not in an oscillation state in which a change in the gain of the downlink to the subscriber terminal is not substantially equal to a change in the measured output power of the slave unit.

36. The computer readable media of claim 35, further comprising:
instructions to generate an indication message to be sent to the master unit if the maximum gain of the downlink to the subscriber terminal for which the slave unit and the master unit are not in the oscillation state is determined to be below a specific level.

* * * * *